Patented July 6, 1948

2,444,849

UNITED STATES PATENT OFFICE 2,444,849

FLINT

Alfred F. Reilly, North Attleboro, Mass.

No Drawing. Application January 11, 1946.
Serial No. 640,667

1 Claim. (Cl. 18—55)

The invention relates to pyrophoric material and has especially to do with the production of flints such as are used for the source of ignition in what are commercially known as pocket lighters or cigar lighters or cigarette lighters. The principal pyrophoric material used in such flints is misch-metal or cerium and its allied rare earth metals. Since these are not entirely stable their manipulation and manufacture into flints has been accompanied by many difficulties. Efforts have been made to provide special molds into which the metal is cast. It has been found necessary or desirable to coat the flints with special materials in order to make them hold their form or to prevent their deterioration or accidental ignition. The materials have been melted in specially devised receptacles before casting and the melting has been conducted in spacial atmospheres and under special pressures.

It has been found that all these costly and difficult procedures may be avoided if the pyrophoric material is added to a synthetic plastic which may act as a binder to hold together and in proper shape the elements going to make up the flint.

The article of the invention generally is produced by thoroughly mixing together the various materials such as, for instance, cerium, iron, possibly zirconium oxide and a suitable plastic binder or perhaps zinc oxide and then extruding the plastic mass through a small orifice to produce a flint of the proper desired size. The extended material may be produced in sections a few inches long and subsequently cut or it may be cut as it extrudes into the shorter lengths of each finished flint. The binder may be present in sufficient quantity to hold the materials together and sufficiently rigid to keep it in shape during handling and the subsequent baking process to which it may be submitted to produce the hardened finished product.

A specific procedure may consist in intimately mixing together about 28.2% of iron, about 65.8% of misch-metal and about 6% of a suitable plastic binder. Any or all of the materials may be put in or mixed either in finely powdered state or in melted state so that the mass may be in a semi-fluid state and only so that it may flow more or less freely into the well of an extruding die. The mass may then be forced by hydraulic or other pressure through the extruding die and may be cut into suitable lengths as it emerges. The pressure during extrusion may tend to force the elements into a permanent adhesion and the cut extruded flints may be submitted to baking at a temperature just high enough to set the plastic permanently. Thus there may be produced by a very simple process flints of the desired composition and rigidity necessary to enter into the lighter and produce sure and repeated ignition when abraded by the lighter ignition apparatus.

Any suitable synthetic plastics or thermoplastics may be used it being understood that preferably a more or less inert plastic will be chosen.

The proportions set out above may be varied within wide limits. Thus the misch-metal may comprise from about 52.5% to 66.5% of the mass; the iron from about 22.5% to 28.5% and the plastic binder from about 5% to 25%.

No special apparatus may be needed but the procedures may be carried out in any suitable mixing, extruding and baking devices such as are now or may hereafter be available.

In the accompanying claim the term "flints" is used to indicate elements of pyrophoric material whether intended for use in lighters or any other use; and the term "plastic" is used to indicate plastic as above described.

I claim as my invention:

A flint consisting of pyrophoric material set in a plastic binder.

ALFRED F. REILLY.

REFERENCES CITED

The following references are of record in the file of this patent:

UNITED STATES PATENTS

| Number | Name | Date |
|---|---|---|
| 837,017 | Welsbach | Nov. 27, 1906 |
| 1,023,208 | Lesmuller | Apr. 16, 1912 |
| 1,951,726 | Cohen | Mar. 20, 1934 |
| 2,078,609 | Pacz | Apr. 27, 1937 |
| 2,271,960 | Taylor | Feb. 3, 1942 |
| 2,378,539 | Dawihl | June 19, 1945 |
| 2,408,400 | Kent | Oct. 1, 1946 |

FOREIGN PATENTS

| Number | Country | Date |
|---|---|---|
| 242,361 | Great Britain | Nov. 9, 1925 |